US008875014B2

(12) United States Patent
Choi

(10) Patent No.: US 8,875,014 B2
(45) Date of Patent: Oct. 28, 2014

(54) CONTENT CLASSIFICATION METHOD AND CONTENT REPRODUCTION APPARATUS CAPABLE OF PERFORMING THE METHOD

(75) Inventor: Hyong-uk Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1812 days.

(21) Appl. No.: 11/737,960

(22) Filed: Apr. 20, 2007

(65) Prior Publication Data

US 2008/0114764 A1 May 15, 2008

(30) Foreign Application Priority Data

Nov. 13, 2006 (KR) .................. 10-2006-0111885

(51) Int. Cl.
G06F 17/00 (2006.01)
G06F 17/30 (2006.01)

(52) U.S. Cl.
CPC .............................. G06F 17/30038 (2013.01)
USPC .......................... 715/241; 715/230; 715/231

(58) Field of Classification Search
USPC .......... 715/230, 231, 234, 241; 707/821, 822, 707/828, 829
See application file for complete search history.

(56) References Cited

U.S. PATENT DOCUMENTS

| 5,592,511 | A  | * | 1/1997  | Schoen et al. ................ 375/220 |
| 5,864,868 | A  | * | 1/1999  | Contois .................................. 1/1 |
| 7,032,178 | B1 | * | 4/2006  | McKnight et al. ............ 715/747 |
| 7,636,509 | B2 | * | 12/2009 | Davis ............................ 386/239 |
| 7,653,341 | B2 | * | 1/2010  | Bucher et al. ................ 455/2.01 |
| 7,680,959 | B2 | * | 3/2010  | Svendsen ....................... 709/248 |
| 2002/0095429 | A1 | * | 7/2002 | Song et al. .................. 707/104.1 |
| 2002/0147728 | A1 | * | 10/2002 | Goodman et al. .......... 707/104.1 |
| 2005/0015712 | A1 | * | 1/2005 | Plastina et al. ............. 715/500.1 |
| 2005/0211071 | A1 | * | 9/2005 | Lu et al. ......................... 84/611 |
| 2007/0123185 | A1 | * | 5/2007 | Welk et al. ................. 455/166.2 |
| 2008/0126384 | A1 | * | 5/2008 | Toms et al. ................... 707/102 |
| 2009/0043811 | A1 | * | 2/2009 | Yamamoto et al. ........ 707/104.1 |

FOREIGN PATENT DOCUMENTS

| JP | 2002-351900 | 12/2002 |
| JP | 2002-373169 | 12/2002 |
| KR | 2005-45248  | 5/2005  |
| KR | 2005-109719 | 11/2005 |

OTHER PUBLICATIONS

Ed Bott; Woody Leonhard, Special Edition Using Microsoft® Office 2000, May 7, 1999, Que.*
Terry William Ogletree; Walter Glenn; Rima Regas, Microsoft® Windows® XP Unleashed, Dec. 11, 2001, Sams.*

(Continued)

Primary Examiner — Stephen Hong
Assistant Examiner — Gregory J Vaughn
(74) Attorney, Agent, or Firm — Jefferson IP Law, LLP

(57) ABSTRACT

A tag-based content classification method of classifying content based on a custom tag defined using user taste-based category information and a content reproduction apparatus to perform the method. The content classification method includes: analyzing content, and classifying the content based on whether the content comprises a first custom tag, the first custom tag and a second custom tag, the first custom tag, the second custom tag, and a tag, or the first custom tag and the tag. The first custom tag is category information based on a user's taste, the second custom tag is usage information based on a pattern of use, and the tag is category information based on content information.

13 Claims, 11 Drawing Sheets

(56) References Cited

OTHER PUBLICATIONS

Online Training Solutions, Inc., Microsoft® XP Step by Step, 2nd Edition, Jul. 27, 2004, Microsoft Press, Chapter 5.*

Kim et al., "User Friendly Multimedia Reproduction Device and Reproduction Method Thereof", English Translation, originally published Nov. 22, 2005 by KIPO, translated to English Apr. 2010 by Schreiber Translations, Inc.*

* cited by examiner

CONTENT CLASSIFICATION METHOD AND CONTENT REPRODUCTION APPARATUS CAPABLE OF PERFORMING THE METHOD

CROSS-REFERENCE TO RELATED APPLICATIONS

This application claims the benefit of Korean Patent Application No. 2006-111885 filed Nov. 13, 2006, in the Korean Intellectual Property Office, the disclosure of which is incorporated herein by reference.

BACKGROUND OF THE INVENTION

1. Field of the Invention

Aspects of the present invention relate to content classification and, more particularly, to a tag-based content classification method and a content reproduction apparatus capable of performing the method.

2. Description of the Related Art

The development of the World Wide Web and large memory capacity of content reproduction apparatuses cause the amount of content which users can access and possess to be greater than users can easily manage. Due to this, the time taken for users to access desired content has been increasing. Various content classification methods to reduce the time taken to access desired content have been suggested.

Tag-based content classification methods classify content based on a description defined in a tag. One of the conventional tag-based content classification methods is the ID3 tag-based content classification method. The ID3 tag-based content classification method classifies content based on content information-based category information, such as artist, genre, and album. The user can thus access desired content based on content information-based category information. The user cannot access desired content based on user taste-based category information. For example, the user can access desired content based on content information-based category information such as artist, song, genre, etc. However, the user cannot access desired content based on user taste-based category information (or user information-based category information) such as drive, love, rain, work, sleep, study, family, etc.

The conventional ID3 tag-based content classification method classifies content based on a predefined order. For example, if content is set to be classified in the order of artist, genre, and album, a result obtained by classifying the content in the order of artist, genre, and album as illustrated in FIG. 1 is provided to the user regardless of the user's pattern of use. In FIG. 1, A and B denote artist names, C denotes an album name, and D, E, F, and G denote music content names corresponding to rock. The user cannot access desired content based on his/her pattern of use.

Even if a reproduction frequency of the content E in the rock category is high, the time taken for the user to access the content E in the rock category is always the same. If the amount of content possessed by the user increases, the time taken for the user to access the content E in the rock category may increase as well.

SUMMARY OF THE INVENTION

Aspects of the present invention provide a tag-based content classification method of classifying content based on a custom tag that is defined using user taste-based category information and a content reproduction apparatus to perform the method.

Aspects of the present invention also provide a tag-based content classification method of classifying content by setting a tag that is defined using content information-based category information as a custom tag and a content reproduction apparatus to perform the method.

Aspects of the present invention also provide a tag-based content classification method of classifying content based on tags that are defined using content information-based category information and user taste-based category information and a content reproduction apparatus to perform the method.

Aspects of the present invention also provide a tag-based content classification method based on a pattern of use and a content reproduction apparatus to perform the method.

According to an aspect of the present invention, there is provided a content classification method comprising analyzing content; and if the content comprises a first custom tag, classifying the content based on the first custom tag, wherein the first custom tag contains at least one item of category information according to a user's taste.

According to another aspect of the present invention, if the content further comprises a second custom tag to monitor a pattern of use, the classifying of the content may comprise classifying the content based on the first custom tag and the second custom tag.

According to another aspect of the present invention, if the content further comprises at least one content-based tag defined using content information-based category information, the classifying of the content may comprise classifying the content based on the first custom tag and the second custom tag; and classifying the content based on the content-based tags, wherein one of the results of the classifying is selectively output according to a request of the user.

According to another aspect of the present invention, if at least one of the content-based tags is set as a custom tag, the classifying the content based on the first custom tag comprises classifying the content based on the first custom tag, the second custom tag, and the at least one content-based tag set as a custom tag.

According to another aspect of the present invention, there is provided a content reproduction apparatus comprising a content analyzer to analyze received content; and a content classifier to classify the content based on a first custom tag if the content comprises the first custom tag, wherein the first custom tag contains at least one item of category information according to a user's taste.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
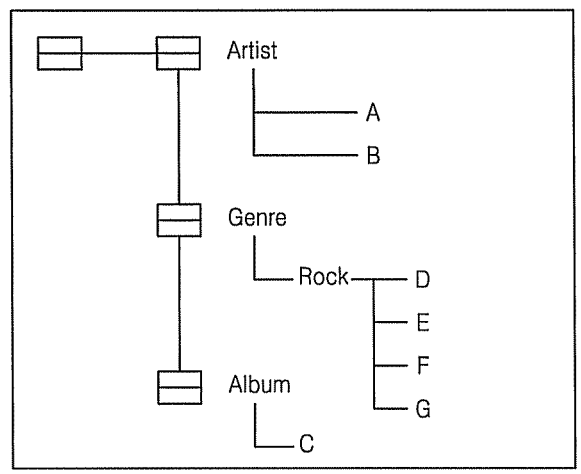
FIG. 1 is a diagram describing a conventional content classification method.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
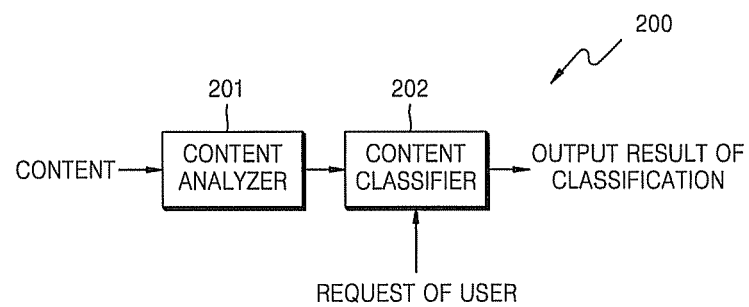
FIG. 2 is a block diagram of a content reproduction apparatus according to an embodiment of the present invention.

FIG. 2 is a block diagram of a content reproduction apparatus 200 according to an embodiment of the present invention. The content reproduction apparatus 200 includes a content analyzer 201 and a content classifier 202. The content reproduction apparatus 200 may be a portable media device, such as a notebook computer, an MP3 player, a mobile phone, or a Digital Multimedia Broadcasting (DMB) receiver, or a device such as a Personal Computer (PC).

The content analyzer 201 analyzes received content. The content analyzer 201 can analyze content when the content is received by the content reproduction apparatus 200 or when content is reproduced by the content reproduction apparatus 200. The content can be received by inputting the content directly into the content reproduction apparatus 200 or by downloading the content to the content reproduction apparatus 200 using a network such as the Internet. The content may include music-based content, image or video-based content, text-based content, and/or multimedia-based content. In other words, the content may be music-based content (such as a music file), image/video-based content (such as a photograph or video), text-based content, and/or multimedia-based content.

The content analyzer 201 determines whether the received content contains a tag. If the received content contains a tag, the content analyzer 201 can determine whether the tag contained in the content is a content information-based tag or a user information-based tag. In addition, the content analyzer 210 can determine whether a tag set as the user information-based tag is in the content information-based tag. If the received content contains the content information-based tag and the user information-based tag, the content analyzer 201 can determine which category information is contained in each tag.

The content information-based tag may be the same as a conventional ID3 tag and is used to set content information-based category information, such as artist, genre, album, etc. The user information-based tag is used to set user taste-based category information, such as drive, love, rain, work, sleep, study, family, etc., and category information based on a pattern use, such as a reproduction frequency and the number of reproductions. Other aspects of the invention may use tag systems other than ID3.

The user information-based tag can be embedded into the content by the user via a content portal or a website, or set in the content by the user using the content reproduction apparatus 200. The user information-based tag is defined hereinafter as a custom tag. A custom tag based on the user taste-based category information is defined as a first custom tag. A custom tag based on the user's using pattern-based category information is defined as a second custom tag. Since the custom tag is used to provide a result obtained by classifying content according to a user's taste, the custom tag can be defined as a smart tag.

The content information-based tag and the custom tag are set using a reserved area of the content. If a reserved area exists in a front end of the content, at least one of the content information-based tag and the custom tag can be set in the front end of the content. If a reserved area exists in a back end of the content, at least one of the content information-based tag and the custom tag can be set in the back end of the content. If reserved areas exist in the front end and back end of the content, at least one of the content information-based tag and the custom tag can be set in the front end and/or the back end of the content.

The tags may be located in any convenient part of the content. If the content is music-based content, at least one of the content information-based tag and the custom tag may be set using at least one of a command field and a variable space of the content. If the content is image-based content, at least one of the content information-based tag and the custom tag may be set using a command field of the content. If the content is video-based content, at least one of the content information-based tag and the custom tag may be set using a description space of the content. If the content is text-based content, at least one of the content information-based tag and the custom tag may be set using a reserved area of the content or another convenient area of the content.

Figure 3:
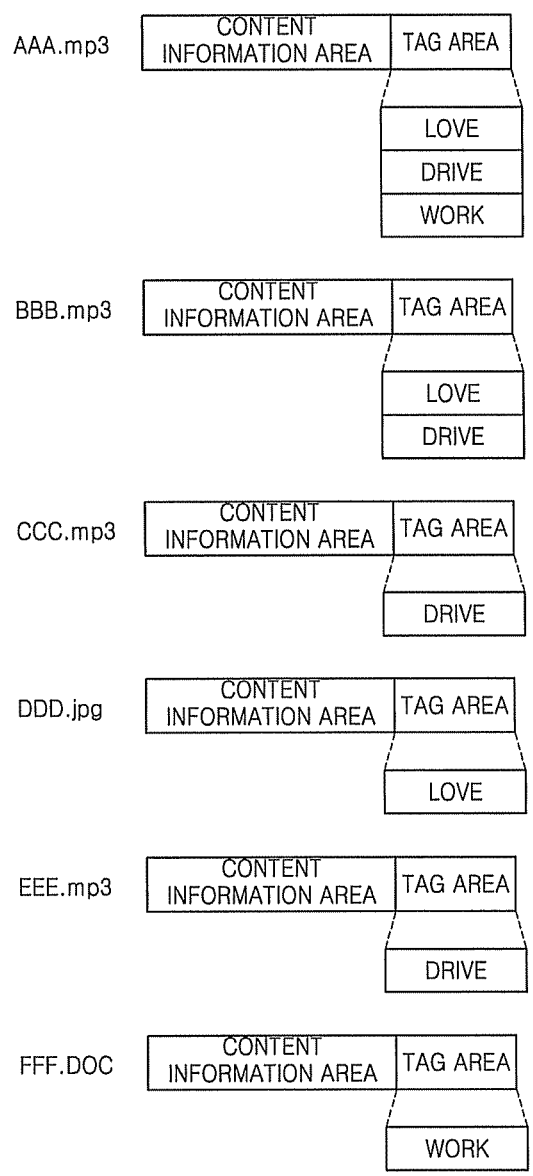
FIG. 3 illustrates data structures of content according to an embodiment of the present invention.

The analysis result of the content analyzer 201 is output to the content classifier 202. If the content includes the first custom tag as the analysis result, the content classifier 202 classifies the content based on the first custom tag. If the content includes the first custom tag, a data structure of the content can be defined as illustrated in FIG. 3. FIG. 3 illustrates data structures of content in which each tag area exists in a back end of the content according to an embodiment of the present invention. However, the data structures are not limited thereto; the tag areas illustrated in FIG. 3 can also be defined to exist in a front end of the content.

Since user information-based category information is set in each tag area in FIG. 3, the tag areas can be called first custom tag areas. FIG. 3 illustrates data structures of .mp3 files AAA, BBB, CCC, and EEE, a .jpg file DDD, and a .doc file FFF. User information-based category information "love", "drive", and "work" is set in the content AAA. User information-based category information "love" and "drive" is set in the content BBB. User information-based category information "drive" is set in the content CCC. User information-based category information "love" is set in the content DDD. User information-based category information "drive" is set in the content EEE. User information-based category information "work" is set in the content FFF.

If the received content is the same as that illustrated in FIG. 3, the content classifier 202 sets "love", "drive", and "work" as category information based on the analysis result with respect to the first custom tag, which is input from the content analyzer 201. The content classifier 202 classifies the content so that each of the corresponding content names is disposed in a lower layer of the category information. The content classifier 202 outputs a content classification result as illustrated in FIG. 4.

Figure 4:
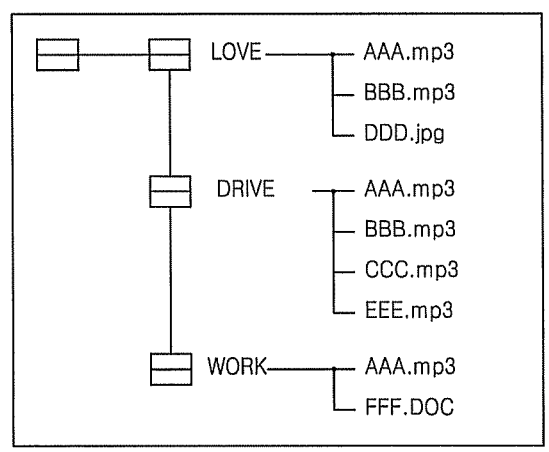
FIG. 4 illustrates a result of content classification, based on the content illustrated in FIG. 3, according to an embodiment of the present invention.

FIG. 4 illustrates a result of content classification based on the content illustrated in FIG. 3, according to an embodiment of the present invention. Categories of the content possessed by the user are "love", "drive", and "work". The "love" category contains the .mp3 files AAA and BBB and the .jpg file DDD. The "drive" category contains the .mp3 files AAA, BBB, CCC, and EEE. The "work" category contains the .mp3 files AAA and the .doc file FFF.

When the content classifier 202 classifies the content, the arrangement order of the category information can be determined by the user or based on the amount of content in each category. FIG. 4 illustrates the case where the user determined the arrangement order of the category information to be "love", "drive", and "work". However, any ordering is possible: if the user determined the arrangement order of the category information to be "drive", "love", and "work", the order of "love" and "drive" shown in FIG. 4 would have the order of "drive" and "love" switched. In addition, the arrangement order is determined according to the amount of content in each category, the arrangement order of "love" and "drive" in FIG. 4 would be changed to the order of "drive" and "love".

Figure 5:
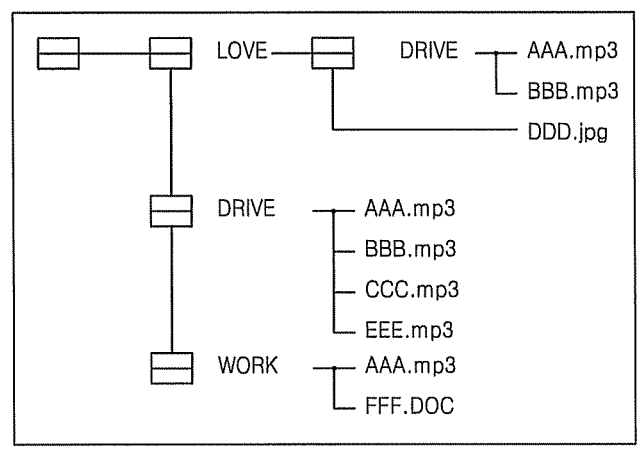
FIG. 5 illustrates a result of content classification, based on the content illustrated in FIG. 3, according to another embodiment of the present invention.

If the user gathers all of the content contained in the "love" and "drive" categories and sets the "drive" category as a child category of the "love" category, a content classification result output from the content classifier 202 with respect to the content illustrated in FIG. 3 is as illustrated in FIG. 5. FIG. 5 illustrates a result of content classification based on the content illustrated in FIG. 3, according to another embodiment of the present invention. The "drive" category is set in a lower layer of the "love" category at the same level as the .jpg file having the content name DDD. Each category can be set in a hierarchical structure according to a request of the user. Thus, the user can quickly access content commonly related to the "love" and "drive" categories.

Figure 6:
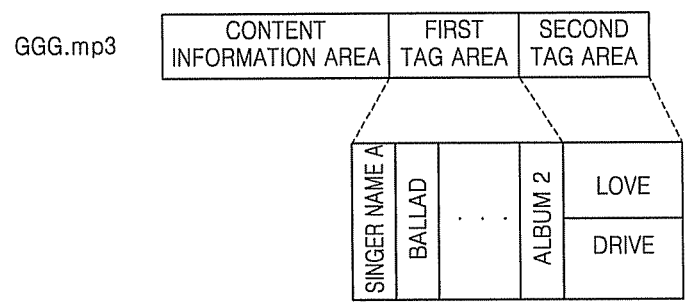
FIG. 6 illustrates a data structure of content according to another embodiment of the present invention.

If a data structure of the received content is the same as that illustrated in FIG. 6, the content analyzer 201 provides an analysis result of the received content to the content classifier 202. The content analysis result provided to the content classifier 202 indicates that the received content includes a first tag area and a second tag area. A plurality of tags defined as the content information-based category information are set in the first tag area and the custom tag is set in the second tag area. The first custom tag includes information indicating the category information contained in the plurality of tags and the category information contained in the custom tag.

FIG. 6 illustrates a data structure of content according to another embodiment of the present invention. A first tag area and a second tag area are included in a back-end of the content. A plurality of tags, defined as the content information-based category information, is set in the first tag area. The first custom tag is set in the second tag area. The positions of the first tag area and the second tag area can be exchanged. The first tag area and the second tag area can exist in a front end of the content.

Figure 7:
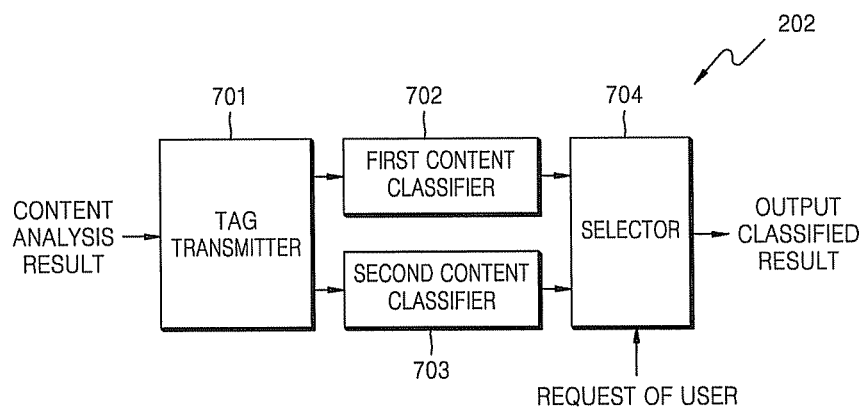
FIG. 7 is a block diagram of the content classifier illustrated in FIG. 2, according to an embodiment of the present invention.

If received content has the data structure illustrated in FIG. 3 or the data structure illustrated in FIG. 6, the content classifier 202 can be configured as illustrated in FIG. 7. FIG. 7 is a block diagram of the content classifier 202 illustrated in FIG. 2, according to an embodiment of the present invention. The content classifier 202 includes a tag transmitter 701, a first content classifier 702, a second content classifier 703, and a selector 704.

When the content analysis result is received, the tag transmitter 701 transmits category information of the first custom tag set in the second tag area to the first content classifier 702 and transmits category information of the plurality of tags set in the first tag area to the second content classifier 703.

Figure 8:
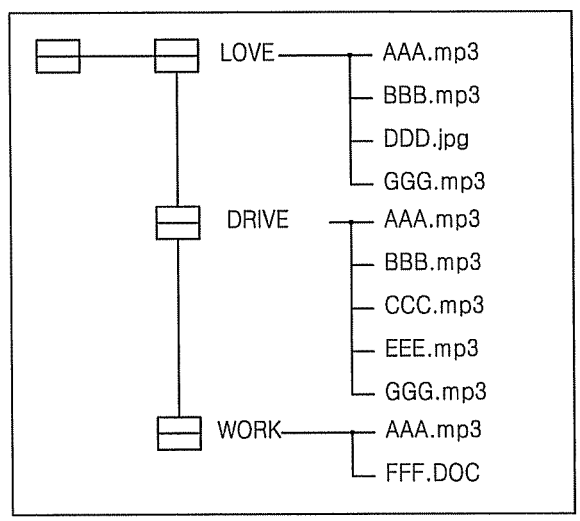
FIG. 8 illustrates a first result of content classification, based on the content illustrated in FIGS. 3 and 6, according to an embodiment of the present invention.

The first content classifier 702 classifies the content based on the first custom tag. Like the content classification operation of the content classifier 202 illustrated in FIG. 3, the first content classifier 702 classifies the content. The content being received includes the content illustrated in FIG. 3 and the content illustrated in FIG. 6. The content illustrated in FIG. 6 has category information "love" and "drive" in the first custom tag. Thus, a content classification result output from the first content classifier 702 can be defined as illustrated in FIG. 8. FIG. 8 illustrates a first result of content classification, based on the content illustrated in FIGS. 3 and 6, according to an embodiment of the present invention. Unlike FIG. 4, FIG. 8 shows a content classification result in which an .mp3 file having a content name GGG is contained in the "love" category and the "drive" category.

Figure 9:
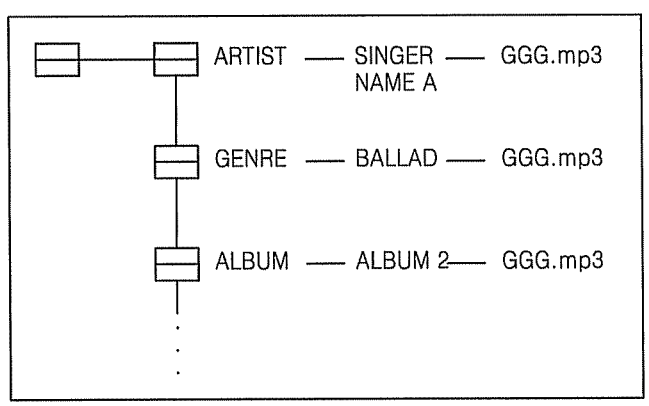
FIG. 9 illustrates a second result of content classification, based on the content illustrated in FIGS. 3 and 6, according to an embodiment of the present invention.

The second content classifier 703 classifies the content based on the plurality of tags set in the first tag area. Referring to FIG. 6, in the plurality of tags, "singer name A" is set as an artist, "ballad" is set as a genre, and "album2" is set as an album name. The second content classifier 703 classifies the content based on category information "artist", "genre", and "album" as illustrated in FIG. 9. FIG. 9 illustrates a second result of content classification, based on the content illustrated in FIGS. 3 and 6, according to an embodiment of the present invention. The reason why the second result of content classification, illustrated in FIG. 9, includes only information on the content illustrated in FIG. 6 is that the content illustrated in FIG. 3 does not include a tag in which content information-based category information is set.

The selector 704 selects one of an output of the first content classifier 702 and an output of the second content classifier 703 according to a request of the user and outputs the selected output.

At least one of the plurality of tags in the first tag area included in the content illustrated in FIG. 6 can be set as a third custom tag. At least one of the plurality of tags can be set as the third custom tag when the custom tag is set in the content. When the custom tag is embedded in the content by the user in a content portal or a website or when the custom tag is set in the content by the user in the content reproduction apparatus 200, at least one of the plurality of tags can be set as the custom tag.

Figure 10:
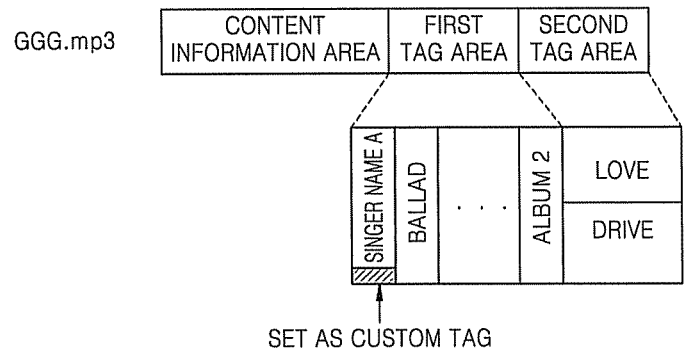
FIG. 10 illustrates a data structure of content according to another embodiment of the present invention.
Figure 11:
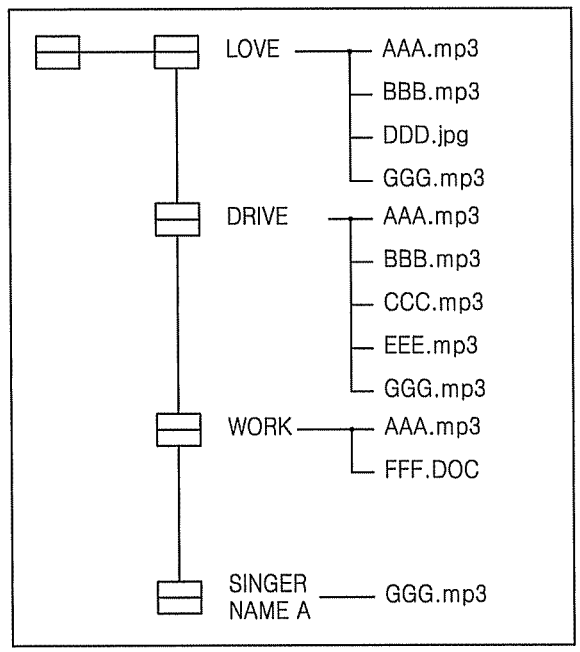
FIG. 11 illustrates a result of content classification, based on the content illustrated in FIGS. 3 and 10, according to an embodiment of the present invention.

FIG. 10 illustrates a data structure of content according to another embodiment of the present invention, in which an artist tag is set as the third custom tag. The content illustrated in FIG. 10 has the same data structure as that illustrated in FIG. 6 except that the artist tag is set as the third custom tag. If a data structure of the received content is the same as illustrated in FIG. 10 instead of that illustrated in FIG. 6, the first content classifier 702 receives information on the artist tag from the tag transmitter 701. The first content classifier 702 classifies the content based on the first custom tag and the tag set as the third custom tag (in the content shown in FIG. 10, the artist tag). Since the "singer name A" is set in the artist tag in FIG. 10, a content classification result output from the first content classifier 702 can be defined as illustrated in FIG. 11. FIG. 11 illustrates a result of content classification, based on the content illustrated in FIGS. 3 and 10, according to an embodiment of the present invention. The content is classified so that an .mp3 file GGG is contained in the "love" category, the "drive" category, and the "singer name A" category.

Figure 12:
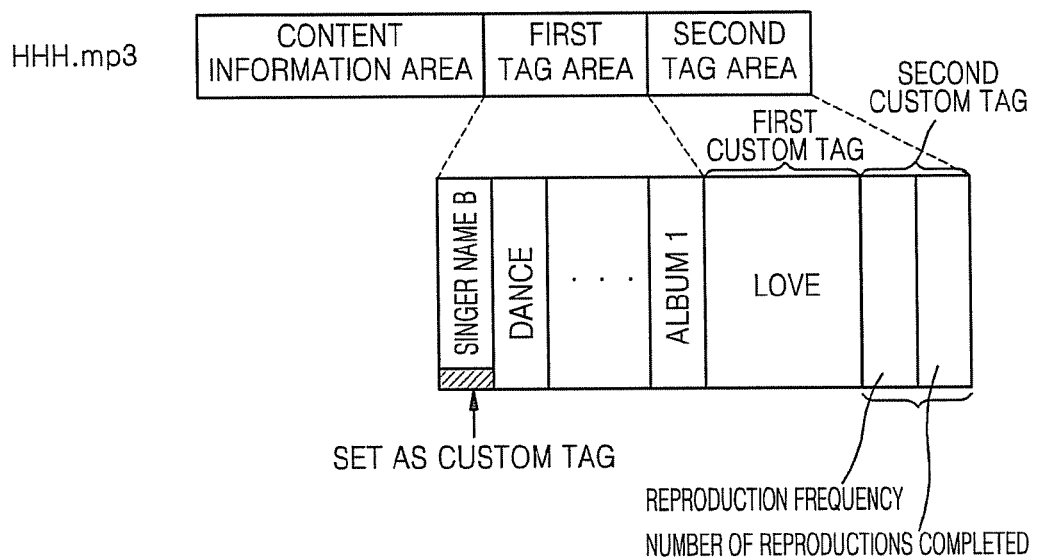
FIG. 12 illustrates a data structure of content according to another embodiment of the present invention.

FIG. 12 illustrates a data structure of content according to another embodiment of the present invention. The content illustrated in FIG. 12 is an .mp3 file HHH in which a plurality of tags defined as content information-based category information is set in a first tag area, and a first custom tag and a second custom tag which is a category information-based custom tag through which a using pattern of the user can be known, are set in a second tag area. If the received content has a data structure as illustrated in FIG. 12, the first content classifier 702 classifies the content based on the first custom tag and the second custom tag.

Category information set in the second custom tag illustrated in FIG. 12 contains reproduction frequency information and information on the number of reproductions completed. For the reproduction frequency information, a value incremented every time reproduction of the content HHH starts is set. For the information on the number of reproductions completed, a value incremented every time reproduction of the content HHH is completed is set. An arrangement order of content included in the same category can be determined based on the information set in the second custom tag. The first content classifier 702 can classify the content so that content having both a higher reproduction frequency and a higher number of reproductions completed is arranged in the uppermost position in the same category. Content having both a lower reproduction frequency and a lower number of reproductions completed is arranged in the lowermost position in the same category. For category information set in the first custom tag, a value incremented on a category information basis each time reproduction of the content HHH starts can also be set.

Figure 13:
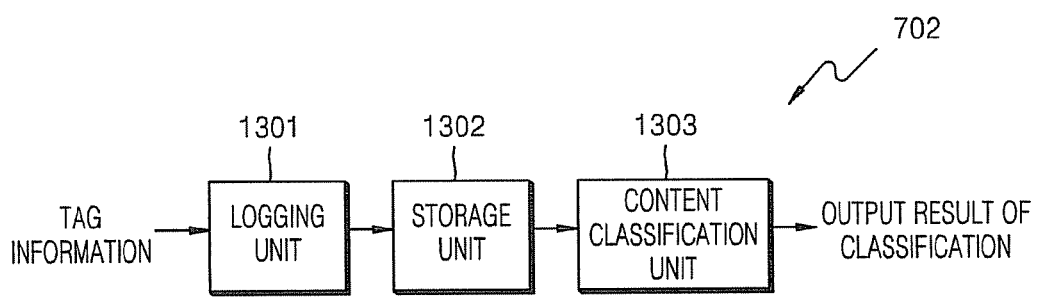
FIG. 13 is a block diagram of the first content classifier illustrated in FIG. 7, according to an embodiment of the present invention.

In order to classify content as described above, the first content classifier 702 can be configured as illustrated in FIG. 13. FIG. 13 is a block diagram of the first content classifier 702 illustrated in FIG. 7, according to an embodiment of the present invention. The first content classifier 702 includes a logging unit 1301, a storage unit 1302, and a content classification unit 1303.

The logging unit 1301 logs the category information defined in the first custom tag and the second custom tag. If the received content has the data structure illustrated in FIG. 12 in which an artist tag is not set as the third custom tag, and if reproduction of the content is completed, the logging unit 1301 logs "love", "reproduction frequency", and "the number of reproductions completed". If the received content has the data structure illustrated in FIG. 12 in which the artist tag is not set as the third custom tag, and if reproduction of the content is not completed, the logging unit 1301 logs "love" and "reproduction frequency". If the received content is the content AAA, the logging unit 1301 logs "love", "drive", and "work". If the received content has the data structure illustrated in FIG. 12, and if reproduction of the content is completed, the logging unit 1301 logs category information defined in the first custom tag, the second custom tag and a tag set as a custom tag. The logging unit 1301 logs "singer name B", "love", "reproduction frequency", and "the number of reproductions completed". If the received content has the data structure illustrated in FIG. 12, and if reproduction of the content is not completed, the logging unit 1301 logs "singer name B", "love", and "reproduction frequency".

The storage unit 1302 stores the result of the logging. If the received content is the content illustrated in FIGS. 3, 10, and 12, the storage unit 1302 stores results obtained by logging the category information of the content illustrated in FIGS. 3, 10, and 12.

Figure 14:
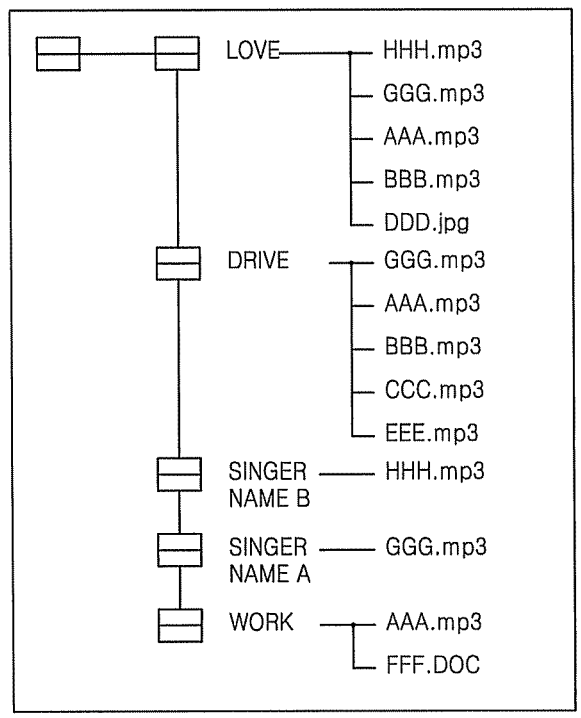
FIG. 14 illustrates a result of content classification, based on the content illustrated in FIGS. 3, 10, and 12, according to an embodiment of the present invention.

The content classification unit 1303 classifies the content by determining the importance of each of the category information and/or content based on the results of the logging, which are stored in the storage unit 1302. If the order of importance is determined to be "love", "drive", "singer name B", "singer name A", and "work" based on the results of logging, the order of the content in the "love" category is determined to be HHH, GGG, AAA, BBB, and DDD, the order of the content in the "drive" category is determined to be GGG, AAA, BBB, CCC, and EEE, and the order of the content in the "work" category is determined to be AAA and FFF. The content classification unit 1303 outputs a result of content classification as illustrated in FIG. 14, based on the content illustrated in FIGS. 3, 10, and 12.

According to the results of the logging, the importance can be evaluated as being high as the number of logged counts of a tag increases. FIG. 14 indicates that the logged counts of the "love" category is the greatest of the "love", "drive", "singer name B", "singer name A", and "work" categories and indicates that the logged counts of the content HHH are the greatest in the "love" category.

Figure 15:
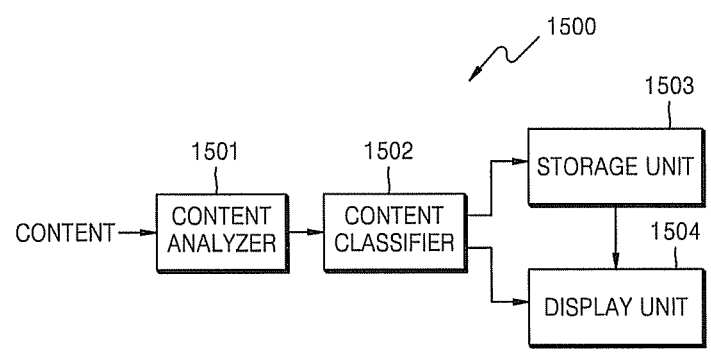
FIG. 15 is a block diagram of a content reproduction apparatus according to another embodiment of the present invention.

FIG. 15 is a block diagram of a content reproduction apparatus 1500 according to another embodiment of the present invention. The content reproduction apparatus 1500 includes a content analyzer 1501, a content classifier 1502, a storage unit 1503, and a display unit 1504. The content analyzer 1501 and the content classifier 1502 operate similarly to the content analyzer 201 and the content classifier 202 illustrated in FIG. 2.

The storage unit 1503 stores a result of content classification output from the content classifier 1502. Every time a stored result is requested, the storage unit 1503 outputs the stored result of content classification to the display unit 1504. The display unit 1504 displays the result of content classification output from the content classifier 1502 or the storage unit 1503. The displayed result of content classification can be displayed in a text format as illustrated in FIGS. 4, 5, 8, 9, 11, and 14. However, as illustrated in FIG. 16, the displayed content classification result can be displayed in another fashion in order to display the importance of the category information more clearly.

Figure 16:
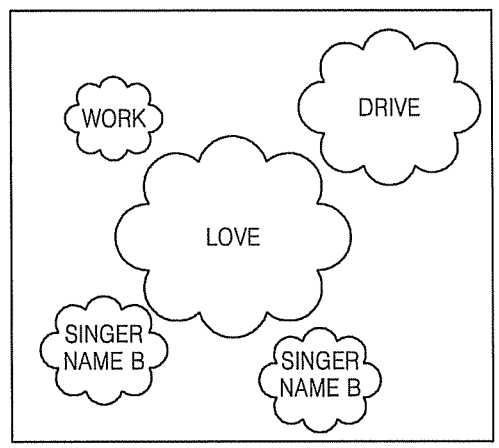
FIG. 16 illustrates a content classification screen according to an embodiment of the present invention.

FIG. 16 illustrates a content classification screen according to an embodiment of the present invention. The importance of content which a user can currently access is set in the order of "love", "drive", "singer name B", "singer name A", and "work" categories. The "love" category is the largest, indicating that the "love" category is the category with the highest importance.

Figure 17:
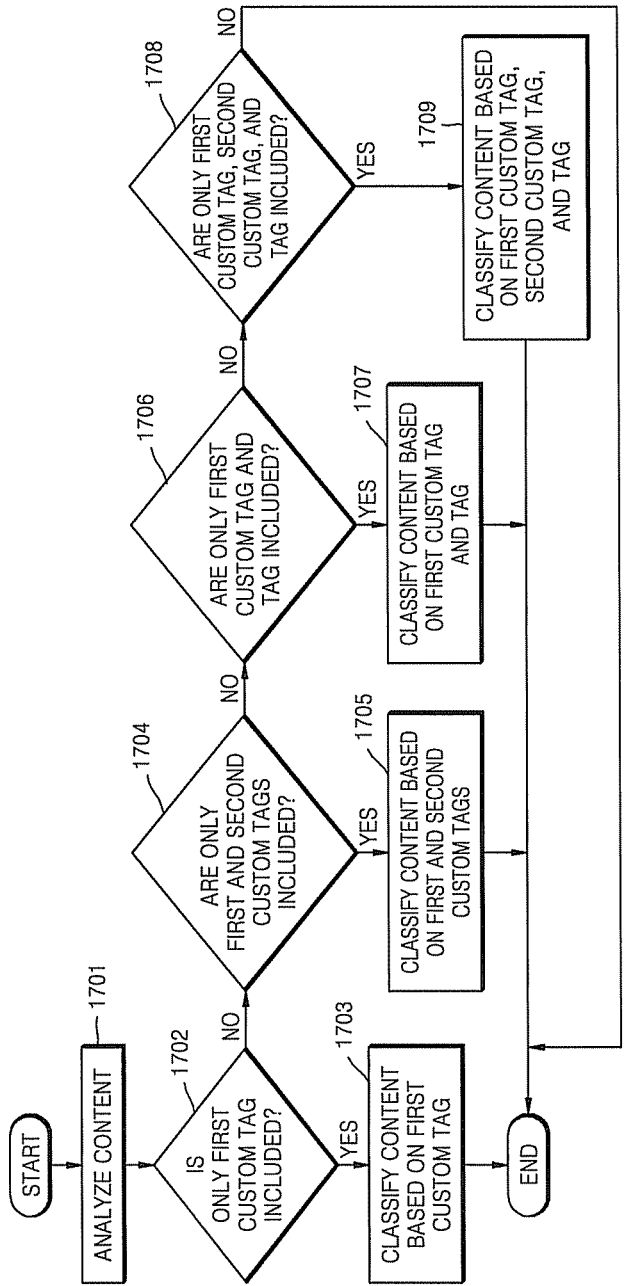
FIG. 17 is a flowchart illustrating a content classification method according to an embodiment of the present invention.

FIG. 17 is a flowchart illustrating a content classification routine according to an embodiment of the present invention. Content is analyzed in operation 1701. The content analysis can be performed as described in the content reproduction apparatus 200 illustrated in FIG. 2. The content can be analyzed when content is received or when content is reproduced. The content may include music-based content, image or video-based content, text-based content, and/or multimedia-based content.

If, in operation 1702, the content contains only a first custom tag, the content is classified based on the first custom tag in operation 1703. The first custom tag contains at least one piece of category information according to a user's taste. If only the first custom tag is contained in the received content, the content classification method is the same as illustrated in FIG. 2.

Figure 18:
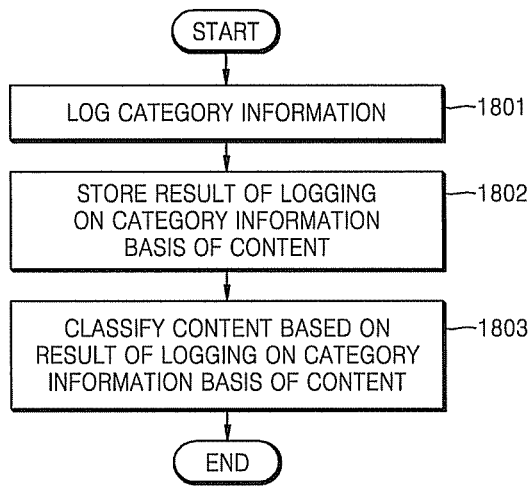
FIG. 18 is a flowchart illustrating a content classification process illustrated in FIG. 17, according to an embodiment of the present invention.

However, as illustrated in FIG. 13, the content can be classified by logging each piece of category information contained in the first custom tag and determining the importance of each piece of the category information based on a result obtained by logging category information included in each piece of the content. The content can be classified as illustrated in FIG. 18. FIG. 18 is a flowchart illustrating a content classification process illustrated in FIG. 17, according to an embodiment of the present invention. Each piece of the category information contained in the first custom tag is logged in operation 1801. A result of logging on a category information basis of the content is stored in operation 1802. The content is classified based on the result of logging on the category information basis of the content in operation 1803.

If, in operation 1704, the content contains only the first custom tag and a second custom tag, the content is classified based on the first custom tag and the second custom tag in operation 1705. The second custom tag is a custom tag to monitor a pattern of use. When the content is reproduced, operation 1705 can be performed as illustrated in FIG. 18. The category information contained in the first custom tag and the second custom tag is logged in operation 1801. A result of logging on the category information basis of the content is stored in operation 1802. The content is classified by determining the importance of each piece of the category information and/or the importance of each piece of the content based on the result of logging on the category information basis of the content in operation 1803.

If, in operation 1706, the content contains only the first custom tag and at least one of the tags defined as content information-based category information, the content is classified based on the first custom tag and the at least one tag in operation 1707. As illustrated in FIG. 7, the content is classified based on the first custom tag, the content is classified based on the least one tag, and one of the result of content classification based on the first custom tag and the result of content classification based on the at least one tag is selectively output.

If, in operation 1708, the content contains only the first custom tag, the second custom tag, and at least one of the tags defined as content information-based category information, the content is classified based on the first custom tag, the second custom tag, and the at least one tag in operation 1709. The content is classified based on the first custom tag and the second custom tag, the content is classified based on the at least one tag, and one of the result of content classification based on the first custom tag, the second custom tag, and the result of content classification based on the least one tag is selectively output.

In addition, if the at least one tags defined as content information-based category information is set as the third custom tag, when the content is classified in operation 1707 or 1709, the content is classified based on the tag set as the third custom tag.

Figure 19:
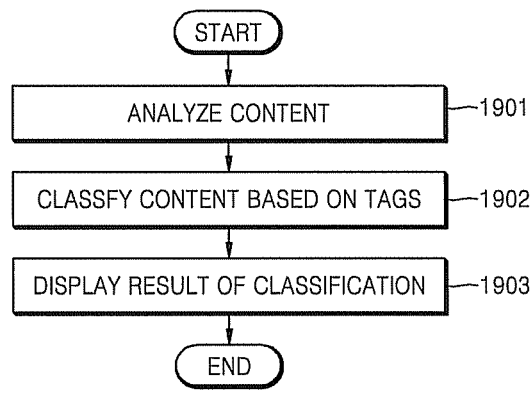
FIG. 19 is a flowchart illustrating a content classification method according to another embodiment of the present invention.

FIG. 19 is a flowchart illustrating a content classification routine according to another embodiment of the present invention. As in operation 1701, content is analyzed in operation 1901. As in operations 1702 through 1709, the content is classified based on tags in operation 1902. The tags can include the first custom tag, the second custom tag, and the tags defined as content information-based category information.

The content classification result is displayed in operation 1903. The content classification result can be displayed so that the importance of the category information and/or the importance of the content is displayed. The importance of the category information and/or the importance of the content can be determined by the logging operation described in relation to FIG. 13.

The custom tags used in the embodiments described above can be used to display image content in a slide show format and to reproduce multimedia associated with music when the image content is reproduced. The reproduction can be performed by recording the same category information in custom tags of the image content, which a user desires to display in a slide show format, and recording the same category information in the image content, which the user desires to reproduce as multimedia.

Content classification techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to aspects of the present invention, by classifying content based on a custom tag defined as user taste-based category information, a user can access desired content more quickly by using the user taste-based category information. For example, while driving, the user can access content that the user frequently reproduces more quickly using a "drive" category information.

In addition, the user can access desired content using the content information-based category information as user taste-based category information by setting a tag defined based on conventional content information-based category information as the third custom tag and classifying content based on the third custom tag. For example, if the user sets "jazz", which is content information-based category information, as the third custom tag, the user can access content related to jazz more quickly using the category information "jazz".

The user can access desired content using various kinds of information by classifying content using both tags defined based on the conventional content information-based category information and custom tags.

In addition, by classifying content using a custom tag defined based on a pattern of use, the user can access desired content more quickly based on the using pattern of the user. For example, if a reproduction frequency of content related to a "drive" category is the highest from among "love", "rain", and "drive" categories, since content is classified so that the user can access the content contained in the "drive" category earlier than content contained in the "love" and "rain" categories, the user can access the content contained in the "drive" category more quickly.

By displaying category information set in a custom tag in a cloud form in which the size of the cloud corresponding to the category information is determined according to the importance or reproduction frequency of the category information, the user can easily determine the category information having a higher importance or reproduction frequency.

Furthermore, when image content is reproduced, based on a custom tag, the image content can be displayed in a slide show format, and the image content can be reproduced in multimedia associated with music.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for classifying a plurality of content by an apparatus, the method comprising:
    logging information contained in a first custom tag and a second custom tag associated with the content, wherein the content has the first custom tag containing user taste-based category information and the second custom tag containing information for monitoring a use pattern of the content;
    classifying the plurality of content based on a result of the logging; and
    storing a result of the classification in a storage unit,
    wherein the information for monitoring the use pattern of the content comprises reproduction frequency information related to the content and information on a number of reproduction completions related to the content.

2. The content classification method of claim 1, wherein the content further comprises at least one content-based tag defined using content information-based category information,
    wherein one or more of the least one of the content-based tags is set as a third custom tag, and
    wherein the logging of the information comprises logging the at least one content-based tag set as the third custom tag.

3. The method of claim 1, wherein the logging of the information is performed after receiving the content or after reproducing the content.

4. The method of claim 1, wherein the classifying of the content comprises:
    determining at least one of the importance of each of the category information and the importance of the content based on the result of the logging, and
    classifying the content based on a result of the determination.

5. The method of claim 1, further comprising displaying a result obtained by classifying the content.

6. The method of claim 1, wherein the content comprises at least one of music-based content, image or video-based content, text-based content, and multimedia-based content.

7. The method of claim 1, wherein, if the content is music-based content, the first custom tag and the second custom tag are set using at least one of a command field and a variable space of the content;
    wherein, if the content is image-based content, the first custom tag and the second custom tag are set using the command field of the content,
    wherein, if the content is video-based content, the first custom tag and the second custom tag are set using a description space of the content, and
    wherein, if the content is text-based content, the first custom tag and the second custom tag are set using a reserved area.

8. A content reproduction apparatus comprising:
    a logging unit to log information contained in a first custom tag and a second custom tag associated with a content, wherein the content has the first custom tag containing at least one item of category information based on a user's taste, and the second custom tag containing information for monitoring a use pattern of the content;
    a content classifier to classify a plurality of content based on a result of the logging by the logging unit; and
    a storage unit to store a result of the classification,
    wherein the information for monitoring the use pattern of the content comprises reproduction frequency information related to the content and information on the number of reproduction completions related to the content.

9. The content reproduction apparatus of claim 8, wherein the content further comprises at least one content-based tag defined using content information-based category information,
    wherein one or more of the at least one content-based tag is set as a third custom tag, and
    wherein the logging unit logs one or more of the at least one content-based tag set as the third custom tag.

10. The content reproduction apparatus of claim 8, wherein the logging unit operates after receiving the content by the content reproduction apparatus or after reproducing the content by the content reproduction apparatus.

11. The content reproduction apparatus of claim 8, wherein the content classifier determines at least one of the importance of each of the items of category information and the importance of the content based on the result of the logging, and classifies the content based on a result of the determination.

12. The content reproduction apparatus of claim 8, further comprising a display unit to display a result obtained by classifying the plurality of content.

13. A non-transitory computer readable medium having one or more programs which include commands for executing a method for classifying a plurality of content, wherein the method comprises:
    logging information contained in a first custom tag and a second custom tag associated with the content, wherein the content has the first custom tag containing user taste-based category information and the second custom tag containing information for monitoring a use pattern of the content;
    classifying the plurality of content based on a result of the logging; and
    storing a result of the classification in a storage unit,
    wherein the information for monitoring the use pattern of the content comprises reproduction frequency information related to the content and information on a number of reproduction completions related to the content.

* * * * *